United States Patent [19]

Higgins et al.

[11] Patent Number: 5,082,570

[45] Date of Patent: Jan. 21, 1992

[54] REGENERABLE INORGANIC MEDIA FOR THE SELECTIVE REMOVAL OF CONTAMINANTS FROM WATER SOURCES

[75] Inventors: Irwin R. Higgins; Mark S. Denton, both of Anderson County, Tenn.

[73] Assignee: CSA Division of Lake Industries, Inc., Oak Ridge, Tenn.

[21] Appl. No.: 633,029

[22] Filed: Dec. 24, 1990

Related U.S. Application Data

[63] Continuation-in-part of Ser. No. 598,987, Oct. 17, 1990, which is a continuation-in-part of Ser. No. 316,810, Feb. 28, 1989, abandoned.

[51] Int. Cl.$^5$ .............................................. C02F 1/42
[52] U.S. Cl. ................................... 210/683; 210/660; 210/670; 210/673; 210/679; 210/681; 210/688; 204/96; 204/105 M; 423/605
[58] Field of Search ............ 204/96, 105 M; 423/605; 210/660, 670, 673, 678, 683, 688, 669, 668, 681

[56] References Cited

U.S. PATENT DOCUMENTS 4,551,254 11/1985 Imada et al. ...................... 210/688
4,581,219 4/1986 Imada et al. ...................... 423/605

FOREIGN PATENT DOCUMENTS 63-22372 8/1988 Japan .

Primary Examiner—Robert A. Dawson
Assistant Examiner—David Reifsnyder
Attorney, Agent, or Firm—Pitts and Brittian

[57] ABSTRACT

A regenerable inorganic media capable of removing contaminants by catalytic oxidation or reduction, as well as heavy metal adsorption, from well and surface water sources. The specific material is specially-treated microporous battery grade gamma-form electrolytic manganese dioxide, the treatment involving comminuting to a 20–60 mesh size, complete neutralization and washing to remove fines, residual acidity and neutralization products. Certain taste, odor and staining water contaminants such as hydrogen sulfide, iron and manganese can be oxidized and filtered by the media with subsequent removal from the system by simply backwashing with water or water in combination with simple chemicals. Heavy metals are removed by a different adsorption mechanism on the same media followed by regeneration with a dilute acid. Pretreatment of the media with sodium hydrosulfite further allows the removal of residual chlorine. This product demonstrates as high degree of selectivity and a high capacity for all three types of contaminants. The inorganic catalytic oxidizing/reducing and adsorbent material can be placed in larger canisters for point of entry use or in smaller cartridges for point of use applications, depending upon the particular requirement.

14 Claims, 10 Drawing Sheets

+IONAC M-50 GREENSAND
PRESSURE DROP CURVE FROM SYBRON LITERATURE

REGENERABLE INORGANIC MEDIA FOR THE SELECTIVE REMOVAL OF CONTAMINANTS FROM WATER SOURCES

DESCRIPTION

This is a continuation-in-part application based upon application Ser. No. 07/598,987 filed Oct. 17, 1990, which is based upon parent application Ser. No. 07/316,810 filed Feb. 28, 1989, now abandoned.

1. Technical Field

This invention relates generally to the selective removal of pollutants from various sources of contaminated water, and more particularly to the use of specially produced inorganic media for use in reducing certain odor, taste and/or staining causing contaminants, as well as many other contaminants, including heavy metals, found in ground and surface waters.

2. Background Art

Water derived from ground water and surface supplies have always been "contaminated" with naturally occurring materials, such as hydrogen sulfide, iron, manganese, and certain naturally occurring heavy metals derived from the elemental content of the earth and from various biological reactions that occur. More recently these same contaminants, and many more, have been introduced into these sources of water by mining and industrial activities. For example, industrial waste solutions have introduced several heavy metal contaminants into potential sources for drinking water. Various effluents from nuclear processing plants have introduced, for example, uranium, radium, cobalt, barium, strontium and similar ions. Certain of these contaminants are also from naturally occurring sources. This increasing burden of contaminants, and a growing knowledge of the problems they produce, has gradually led to increases in the restrictions concerning the maximum levels of these contaminants at the "point of use" of the water. The Environmental Protection Agency has established the maximum acceptable concentration of these contaminants in drinking water, as listed in Table I.

Probably the most common media for the treatment of water to reduce various contaminants is an ion exchange resin. Depending upon the ions involved, this can be an anion resin, a cation resin or even a mixed resin medium. Generally, the resin beds are not selective as to the ions sorbed. The treatment process typically involves a regenerative bed where the sorbed ions are removed so as to condition the resin for additional removal. However, with some of the above-described contaminants, ion exchangers lack any appreciable affinity or lack the necessary selectivity to remove only the trace impurities.

TABLE I

| EPA DRINKING WATER STANDARDS | |
|---|---|
| PARAMETER | MAXIMUM LEVEL mg/l |
| Arsenic | 0.05 |
| Barium | 1.0 |
| Cadmium | 0.01 |
| Chromium | 0.05 |
| Copper | 1.0 |
| Iron | 0.3 |
| Lead | 0.05 |
| Manganese | 0.05 |
| Mercury | 0.002 |
| Selenium | 0.01 |

TABLE I-continued

| EPA DRINKING WATER STANDARDS | |
|---|---|
| PARAMETER | MAXIMUM LEVEL mg/l |
| Silver | 0.05 |
| Sulfide (Odor Threshold) | 0.025 |
| Radium | 0.01 |
| Gross Alpha | 5 pCi/l |
| Gross Beta | 15 pCi/l |
| Turbidity | 4 millirem/yr |
| Coliform Bacteria | 1/TU |
|  | 1/100 ml |

There are certain organic and inorganic adsorbents that have been utilized in water treatment in the past. One such organic adsorbent is granulated activated carbon. While carbon has exceptional removal capabilities for chlorine and certain organic contaminants, carbon beds lack usefulness for most heavy metals and are usually used in combination with some other treatment method. Bacterial growth is also very prevalent within the carbon bed.

Various zeolites are known for their selective affinities for certain metal ions. For example, "Greensand" (Ionac M-50 available from Sybron Corp.) is a zeolite that has been treated with potassium permanganate to impregnate the surface with a layer of the higher oxidative oxides of manganese. This material has been used specifically for the oxidation and filtration of sulfide, iron and manganese. It has a limited capacity due to having only a surface coating of active material before "breakthrough" occurs, so must be frequently regenerated. When the media is "exhausted", it must be regenerated with more permanganate.

Two other materials having possible use in water treatment are KDF-55D (available from Orc, Inc.) and BIRM (available from Clack, Inc.). Both of these have very limited capacities and affinities and thus are not practical for the treatment of water sources with a variety of contaminants.

Research in this field has also been conducted in Japan, as reported in U.S. Pat. Nos. 4,551,254 and 4,581,154 issued to N. Imada on Nov. 5, 1985 and Apr. 8, 1986, respectively. In the work reported in these patents, powdered electrolytic manganese dioxide (EMD) of a certain type is immersed in an acidic solution of divalent manganese ions for several days. The mass that results is broken into pieces, classified to have a size of 20 to 48 mesh and neutralized. This results in a packing that has high surface activity and macroscopic pores through which water is able to pass readily. The initial powder has microscopic porosity and is of gamma form. After the processing the manganese dioxide is converted, according to the patent, into form type (or a mixture of gamma and beta forms). The macroporous nature of this product provides primarily filtration and not a catalytic or oxidation reaction to retain the contaminants. The product was studied for the removal of low levels of manganese, iron and primarily chromaticity (colored matter) from lakes or rivers. Contact times reported in these references are about 2.5 minutes.

In still other Japanese research, as reported in Japanese Laid Open Patent Application Number 63-194710 (laid open Aug. 11, 1988), alpha type manganese dioxide was tested and reported to be a better media for the removal of low levels (generally below the EPA limits) of contaminants from water than the media reported in the Imada patents.

All of this prior art dealing with electrolytic manganese dioxide teaches that there must be a conversion from the initial complete gamma form to another form (beta plus gamma, beta alone or alpha alone), and that the microscopic pore structure must be converted to a macroscopic pore media. The results obtained in this prior work do not show any breakthrough curves nor any capacities of the beds, and the tests are generally with very low levels of contamination of iron and manganese (from surface waters wherein these elements are in the oxidized state).

Thus, there is a teaching away from the use of an all gamma-form electrolytic manganese dioxide where the microporous structure is retained for adsorption, ion exchange or oxidation-reduction purposes such that, as reported hereinbelow, reactions can occur to achieve high loadings, effective removal of elevated concentrations, significant throughput, and regeneration such that the media in a water purifier can be used over an extended time period. The subject media has the capability of removing sulfide, iron and manganese by oxidation, while removing heavy metals by adsorption. Further, this structure permits the removal of certain contaminating elements by a reduction mechanism (e.g., chlorine removal).

While manganese, iron and organic matter are common contaminants in many waters, the presence of heavy metals is an ever increasing problem and the removal thereof by conventional media has been found to be limited. The Japanese references do not even address the problems encountered in the removal of such contaminants.

Thus, the state-of-the-art of removing contaminants has demonstrated that a wide variety of media was required to selectively remove the various contaminants found to be present in the various sources of water including wells and surface water reservoirs. In order to achieve conformance with EPA standards, each source of water required an analysis and then a design of a purification system to best match removal of the contaminants present in that source. For some of the other contaminants, particularly the heavy metals, the known purification systems are silent as to the effectiveness of removal.

Accordingly, it is an object of the present invention to provide single inexpensive inorganic media that will selectively remove substantially all of the undesired contaminants found in typical water from wells and surface sources.

It is another object to provide an inexpensive media for the removal of water contaminants where the media has sufficient capacity to minimize regeneration operations.

A further object of the present invention is to provide an adsorbent media that can be used in large canisters for "point of entry" water treatment, or in smaller cartridges for "point of use" applications, such as in the home.

Another object of the present invention is to provide a regenerable inorganic media capable of removing contaminants from well and surface water sources by catalytic oxidation or reduction, as well as heavy metal adsorption.

Yet another object is to provide a regenerable inorganic media for removing contaminants from water sources wherein the media is itself bacteriostatic.

It is also an object of the present invention to provide a method for producing an regenerable inorganic media that effectively, and inexpensively, removes heavy metals and similar constituents from water sources.

These and other objects of the present invention will become fully understood upon a consideration of the full description of the invention which follows.

DISCLOSURE OF THE INVENTION

In accordance with the present invention, an inexpensive media is provided for the removal of undesired contaminants from water sources. More specifically, the media is useful for the removal of sulfide, iron and other contaminants, including but not limited to heavy metals, from well water and water derived from surface water sources. The specific media for this use is a specially treated gamma-form microporous battery grade electrolytic manganese dioxide (EMD) that is sized to about 20-60 mesh size, has been neutralized to a pH of about 7-8 to remove reaction products and reduce fines to less than 0.12%, washed and dried. This processed EMD is useful for the removal of sulfide (as $H_2S$), iron, manganese, lead, metals of the arsenic family, certain alpha, beta or gamma emitters, many other heavy metals found on the EPA Interim Primary Drinking Water Standards list, chlorine, dissolved solids, etc. The media has a very high capacity for these contaminants, and is easily regenerated without damage to the media.

BEST MODE FOR CARRYING OUT THE INVENTION

Figure 1:
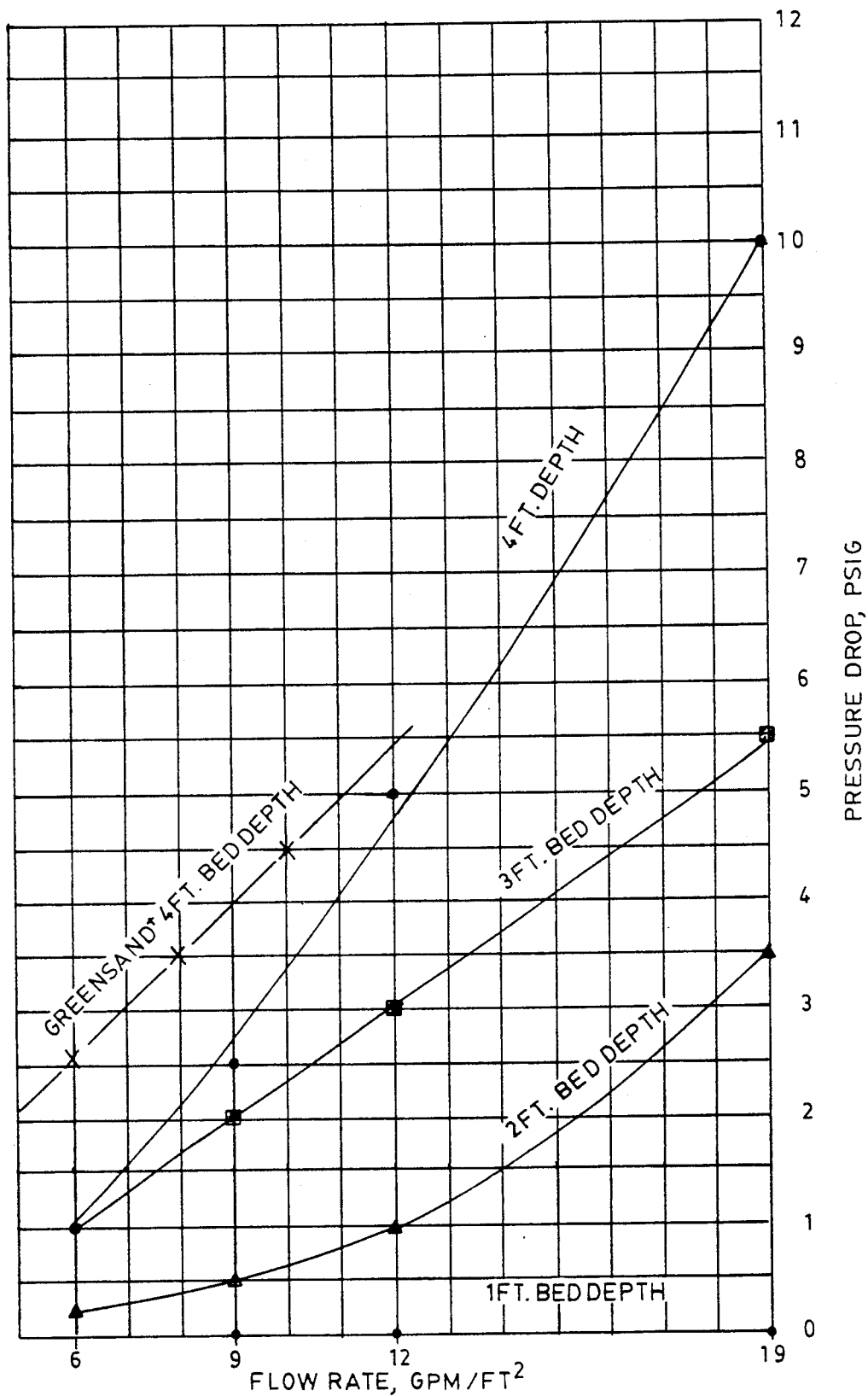
FIG. 1 is a plot showing the relationship of flow rate and pressure drop for various bed lengths of the media of the present invention, with a comparison with one prior art material.

The stability or inertness of manganese dioxide ($MnO_2$) in a severe chemical environment may be noted from its behavior in nature. Geologically deep beds of quite pure $MnO_2$ (80%) were formed from low grade ore over millions of years. Bulk components like silica, iron, aluminum, calcium, magnesium, etc., were slowly leached away leaving the more stable $MnO_2$ minerals as the residual product.

In addition to its inherent stability (i.e., will not leach into potable water), natural manganese dioxide deposits demonstrate a special affinity for certain metals in nature. For example, cobalt is highly enriched in ocean sea modules, and certain manganese ores are mined primarily for their silver. However, this natural manganese dioxide is ineffective as a media for treating water due to the natural "loading" of the deleterious elements.

Very high purity, low cost $MnO_2$ has recently become commercially available for bulk raw material in the form of electrolytic manganese dioxide, referred to hereinafter as EMD. The electrolytic cell process for making EMD is relatively standard world wide. There are many industries which produce the product, each with special product quality characteristics. One typical manufacturer of EMD is Chemetals, Inc. Very high grade ore of 40% to 50% manganese in the form of $MnO_2$ (pure $MnO_2$ is 63% manganese) is first ground and fed to a high temperature reduction furnace with coke or $CH_4$. The MnO which is formed in these furnaces is solubilized in sulfuric acid. This crude manganous sulfate ($MnSO_4$) solution is treated with hydrogen sulfide to precipitate out trace metals. This purified $MnSO_4$ solution is finally fed to one electrolytic cell to form manganese metal or to another cell at different operating conditions to make EMD. The subject media has, therefore, been both chemically and electrolytically purified.

This gamma-form EMD is a form of manganese dioxide that is used mainly as a depolarizer in common batteries to extend shelf life. The shelf life is due principally to the very low level of trace metal contaminants that result from the electrolytic process. The EMD is in a hard granular form as produced, often in "chips" of 1-3 inches. For battery use, the EMD is ground to a very fine powder. Also, this product is very acidic (pH 1-2) due to the sulfuric acid of the process. Neither of these conditions are useful in the treatment of water for satisfactory contaminant removal and media regeneration. This form of manganese dioxide is of the gamma form and is microporous.

It was found, however, that commercial battery-grade EMD can be economically processed into a suitable media for water treatment. The rough EMD chips must first be ground (comminuted) to granules to obtain a material coarse enough to produce a low pressure drop at high flow rates, yet fine enough for a reasonable surface area and contact time. After many studies, the media was standardized at plus 20 mesh to minus 60 mesh (with less than 0.12% fines), which will be designated herein as 20-60 mesh. This distribution, as shown in Table II, exhibited idealized flow rates, backwash rates, surface area, pressure drop and capacity. As determined by the conventional BET method, the surface area of this material is 30-40 $m^2$/g.

TABLE II

| MESH SIZE | % |
| --- | --- |
| 20 | <1 |
| 30 | 38 |
| 40 | 30 |
| 50 | 28 |
| 60 | 3 |
| 80 | <1 |

It was also found from field tests that only certain pressure drops could be tolerated and certain flow rates of water for backwash were available for home use, which were further reasons for these refinements in mesh size. FIG. 1 illustrates these service flow rate characteristics at certain bed depths of media versus pressure drop. The curve for conventional Greensand is also shown for comparison in this figure.

Equally important as the pressure drop across the bed is the ability to backwash the reaction products from the bed with amounts of water commonly available for home use. Table III is an example of one such unit used in a home application.

TABLE III

| SETTING | TIME (mins.) | COMMENTS |
| --- | --- | --- |
| INSTALLATION/START-UP | | |
| Purge | 5-10 | To fill unit with water and purge media of air to avoid floating media to drain with air pockets. Service water goes to drain. |
| B.W. | 30-60 | Up-flow through bed to backwash fines and/or color to drain. |
| Purge | 5-10 | Re-packs column and sends initial treated water to drain. |
| Regular B.W./ Purge Cycle | 10-5 | Unit automatically goes to Service Cycle after a manual B.W. and Purge. Ready for use. |
| CONDITIONS: | | |
| | 7 × 44 | Polyglass Tank |
| | 13/16" | Dip Tube w/0.010" slots |
| | 75% | Full (0.75 cu. ft.) or 90 lbs. EMD Media |
| | Service Flow Design is 5.0 GPM (19 GPM $Ft^2$) | |

| BACKWASH RATE | GPM | GPM/$FT^2$ | % BED EXPANSION |
| --- | --- | --- | --- |
| Minimum | 3.5 | 13.1 | 10 |
| Optimum | 4.0-5.0 | 15.0-18.7 | 15-20 |
| Excessive | 5.25 | 19.6 | Wash Out Occurs |

The start up procedure, equipment conditions, service flow rate and backwash requirements, are given. For all systems, whether domestic or industrial, backwash rates of 13 to 19 gpm/$ft^2$ were found to be necessary with this media.

As mentioned, the as-produced EMD from electrolytic cells contains a residual acid level (sulfuric acid at pH 1-2) and a residual MnII level. Both of these components are intolerable for drinking water treatment because of contamination addition and the lowering of pH. Certain heavy metals would not absorb at the lower pH, for example. It was, therefore, necessary after grinding and screening, to carefully neutralize the media to approximately pH 7-8. Great care must be taken during this neutralization procedure to react all of the acid in that EMD will "bleed" acid and sulfates from the matrix for a time after the surface is completely neutral. It was found that this residual acid could be neutralized with caustic soda (NaOH) followed by a rinse to remove sodium sulfate ($Na_2SO_4$) Excessive application of caustic resulted in a slime on the media and required excessive rinse to lower the pH back to neutral. It was determined that four pounds of caustic was necessary to neutralize 270 pounds of the EMD, or 1.8 pounds NaOH per cubic foot of EMD.

After neutralization, it is equally necessary to thoroughly wash the EMD to remove fines, any residual acid, and neutralization products from the media. The prototype washer was a drum with up flow backwash. It was later proven that washing on the 60 mesh screen itself gave better results. The final production design washer was a tilted, rotating drum with upflow water injection and a 60 mesh screen on top or outlet of the drum. This procedure has allowed the washout of fines (less than 60 mesh) to less than 0.12% without the loss of useable material.

The final step in the preparation of the media is the thorough drying of the material in a rotary kiln or calciner. The product of the above grinding, sizing, neutralization, washing and drying is referred to hereinafter as the "EMD media". It is a microporous, gamma-form EMD.

The EMD media has been utilized for the selective removal of a wide group of contaminants from typical water sources. For example, hydrogen sulfide, iron and manganese are common contaminants in many sources of drinking water. In well water, these contaminants are often in a reduced or partially reduced state. Samples of water with these contaminants were passed through a column 1.9 cm in diameter containing 25 ml of EMD media. A contact time of 45 seconds was used. An analysis of the effluent from the column indicated that $H_2S$, Fe and Mn exhibited substantially complete removal (at least below the maximum permissible EPA levels.) Some of these test waters initially contained up to 25 ppm $H_2S$ and 1 ppm Fe.

The contaminants were oxidized to sulfur, iron oxide and manganic oxide and, subsequently, filtered from the water by the EMD media. Periodically these oxidized products were completely removed by a backwash with water to regenerate the EMD media. The elimination of a chemical regeneration agent, which requires a reactivation step, is a significant improvement over the materials previously used for the removal of these contaminants.

Figure 2:
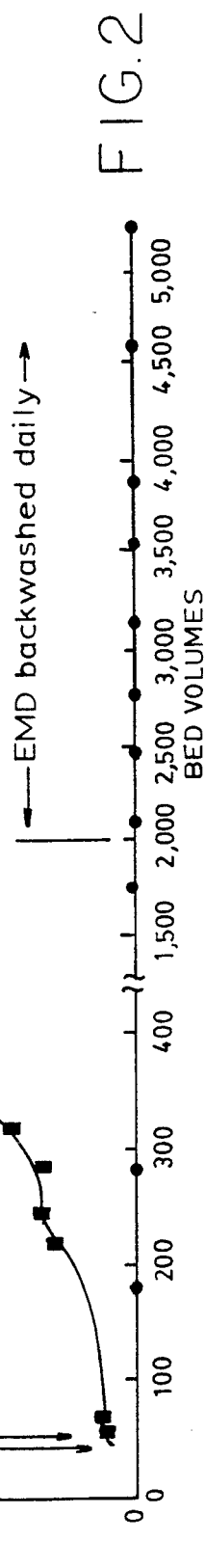
FIG. 2 is a plot of data comparing various media, including that of the present invention, as to the extraction of hydrogen sulfide ($H_2S$) from water.

With very high concentrations of the hydrogen sulfide, iron and/or manganese in the feed water, or after extensive time periods, some gradual building of the contaminants may occur even after using a water backwash. Studies were made of various common reagents that can be used for the complete regeneration. Included in the reagents was chlorine (a water solution), sodium hypochlorite, hydrochloric acid, citric acid, peroxide and ethyl alcohol. The general results are shown in Table IV where it can be seen that the chlorine-containing reagents are generally suitable for complete regeneration of EMD media beds when used for S, Fe and Mn removal from water supplies.

media in each. A larger column (1.0 inch diameter) of 100 ml was used for the EMD media. Since all breakthrough curves were plotted versus bed volumes and capacities as milligrams of contaminant per cubic foot of media, column sizes were equalized. The test solution of the $H_2S$ removal was prepared by adding $Na_2S$ to tap water, one drop hydrazine per two liters of water, providing 11-12 ppm sulfide ion. The contact time was one minute. The KDF-55D bed was loaded to 640 mg/l (18,112 mg/ft$^3$) at 58 bed volumes. The loading was discontinued at this time due to CuS breakthrough. The M-50 bed was loaded to 812 mg/l (23,000 mg/ft$^3$) at 70 bed volumes at apparent breakthrough. In contrast the EMD media was loaded to 21,547 mg/l (609,780 mg/ft$^3$) at 6900 bed volumes without any breakthrough. These results are plotted in FIG. 2.

Figure 3:
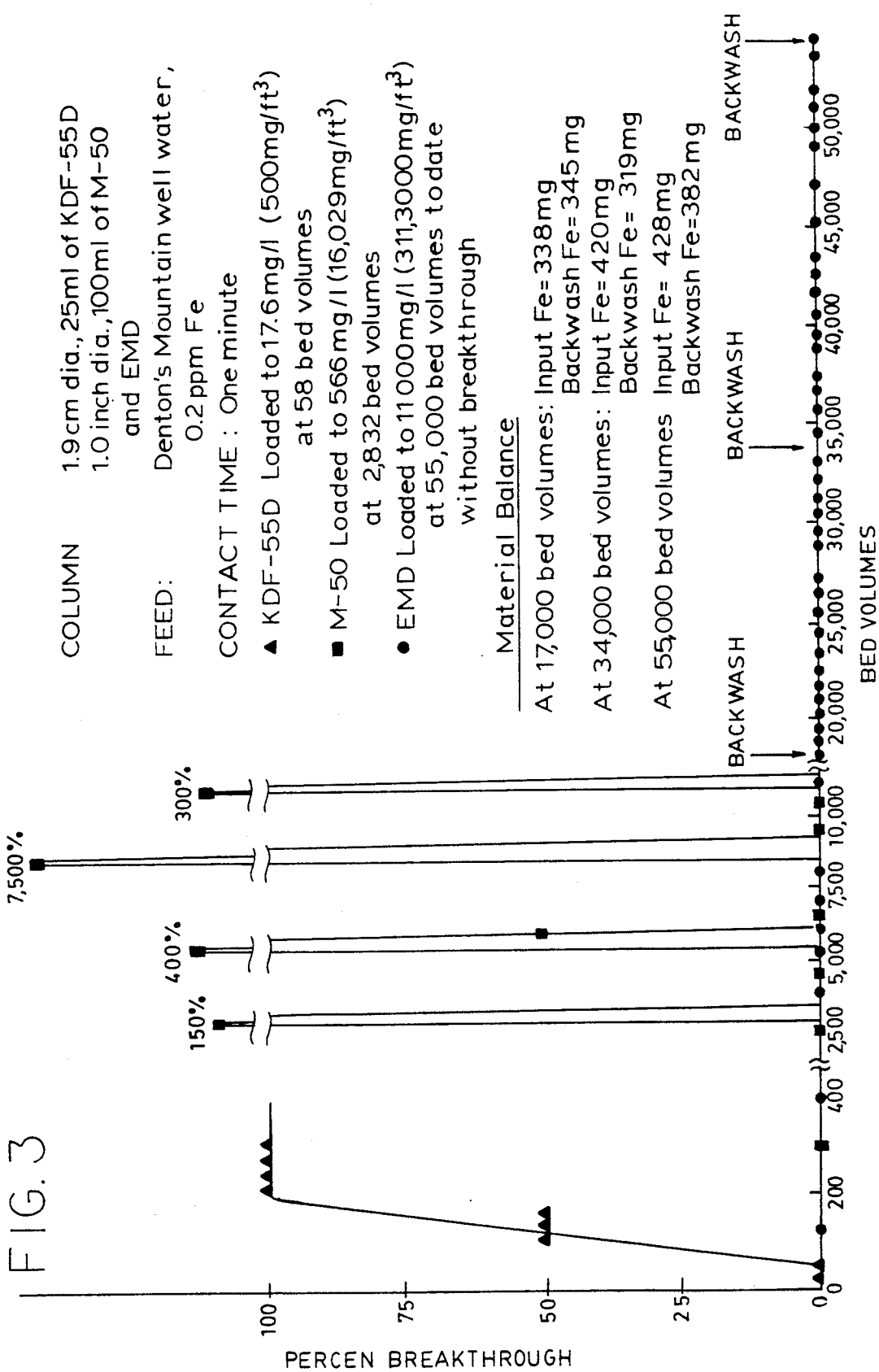
FIG. 3 is a plot of data comparing the same three media as to the extraction of trace iron (Fe) from well water.
Figure 4:
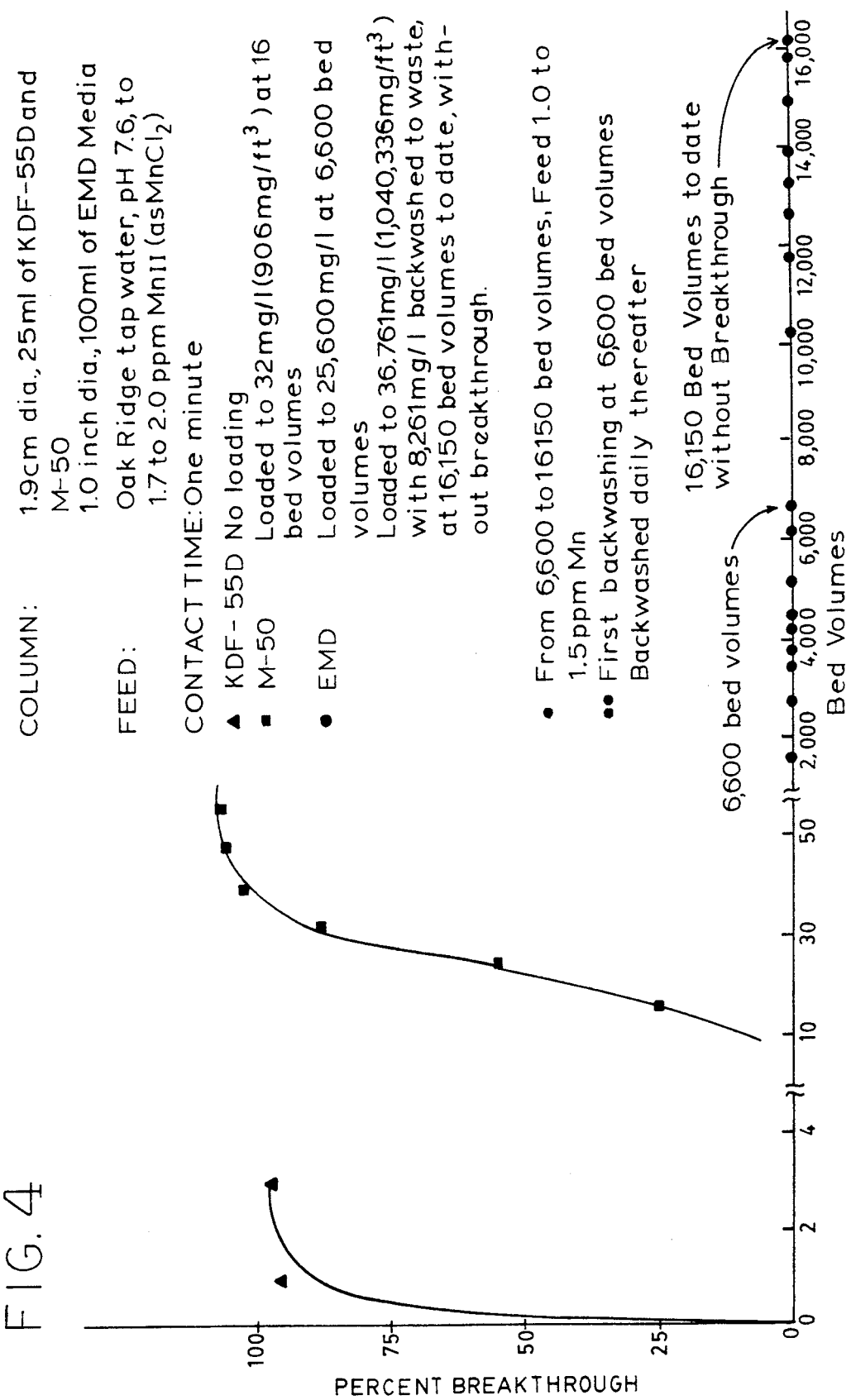
FIG. 4 is a plot of data comparing the same three media as to the extraction of trace manganese (Mn) from water.

The same types of experimental beds were utilized to determine their relative effectiveness for removal of iron (Fe) and manganese (Mn). The results are illustrated in FIGS. 3 and 4, respectively. As with the $H_2S$ test, no breakthrough occurred over the period of the tests with EMD media; however, the other materials demonstrated breakthrough at relatively low loadings (the KDF-55D showed essentially instant breakthrough in the Mn test). From these tests, the EMD media has been shown to have a capacity for sulfide of over 2600% greater than either of the other media, a capacity for iron of at least 2000% greater than the other media, and a capacity for Mn of at least 115,000% greater than the others. Similar improved results have been demonstrated over a commercial water treatment media identified as "BIRM" distributed by Clack, Inc.

Iron generally exists in water as ferrous (FeII) oxide and ferric (FeIII) oxide. In addition, there is often an organic complex of iron from biological degradation of vegetation and/or from bacterial metabolism. This type of iron generally stays in solution and can give an undesirable color and/or odor to the water. Also, even small amounts cause a metallic taste to otherwise useful water. The effectiveness of EMD media for this type of iron has been investigated, and the removal was found to be greater than 90%. Where further removal is required, a combination of the EMD media and other conventional methods is required.

The effluent streams from several industries contain significant quantities of heavy metals such as arsenic, lead, antimony, selenium and bismuth. These can be

TABLE IV

| | \multicolumn{6}{c}{EMD MEDIA CLEANING} |
|---|---|---|---|---|---|---|
| | $Cl_2$ (Gas) | CLOROX ® (NaOCL) | HCl* | $H_3Cit$ | $H_2O_2$ | $C_2H_5OH$ |
| Sulfide | E | NA | E | E-G | G-F | E |
| Iron | G | G | E | E-G (Fe II Feed) F-P (Fe III Feed) | NA | NA |
| Heme Iron | G | G | G | G | NA | NA |
| Manganese | E | E | E | E-G | NA | NA |

*Similar behavior w/$HNO_3$ or $H_2SO_4$
E = Excellent  F = Fair  NA = Not Applicable  G = Good  P = Poor As will be discussed hereinafter, sodium hydrosulfite is useful when the media is used for other contaminant removal.

The effectiveness of contaminant removal by the EMD media, as contrasted to known prior materials, was investigated. Specifically, the EMD media was compared to KDF-55D (of Orc, Inc.) and Ionac M-50 Greensand (of Sybron, Corp.). All the tests were carried out in burettes (1.9 cm diameter) with 25 ml of present in water supplies from such sources as battery waste supplies, run-off from coal piles, certain nuclear reactor operations and even certain natural water sources. These particular heavy metals have little or no affinity for conventional ion exchanger materials. Even if loaded on the ion exchanger, they are readily displaced by more common elements such as calcium, magnesium, sodium, iron and manganese. In addition, various nuclear activities throughout the world as well as certain natural sources, have introduced cobalt-60, radium (and similar materials), as well as other materials that introduce alpha, beta and gamma emitters into the environment. These materials exhibited the following affinity series:

Co and Ra>Ba>U>Sr>Ca>Mg

The EMD media has been tested for the removal of various of these heavy metals from water supplies. A column 1.9 cm in diameter was utilized holding 25 ml of EMD media. Unlike the sulfur, iron and manganese, these heavy metals are bound more strongly to the EMD media and, thus, are removed with dilute acidic solutions, e.g., 0.1 to 0.5 HCl or $HNO_3$, instead of with water. The metals in the acidic effluent from the EMD media can be loaded on a cation exchange resin for further concentration and/or disposal. Treatment with these dilute acids has been shown to be non-detrimental to the effectiveness of the EMD media, and no other treatment is required before reuse.

Figure 5:
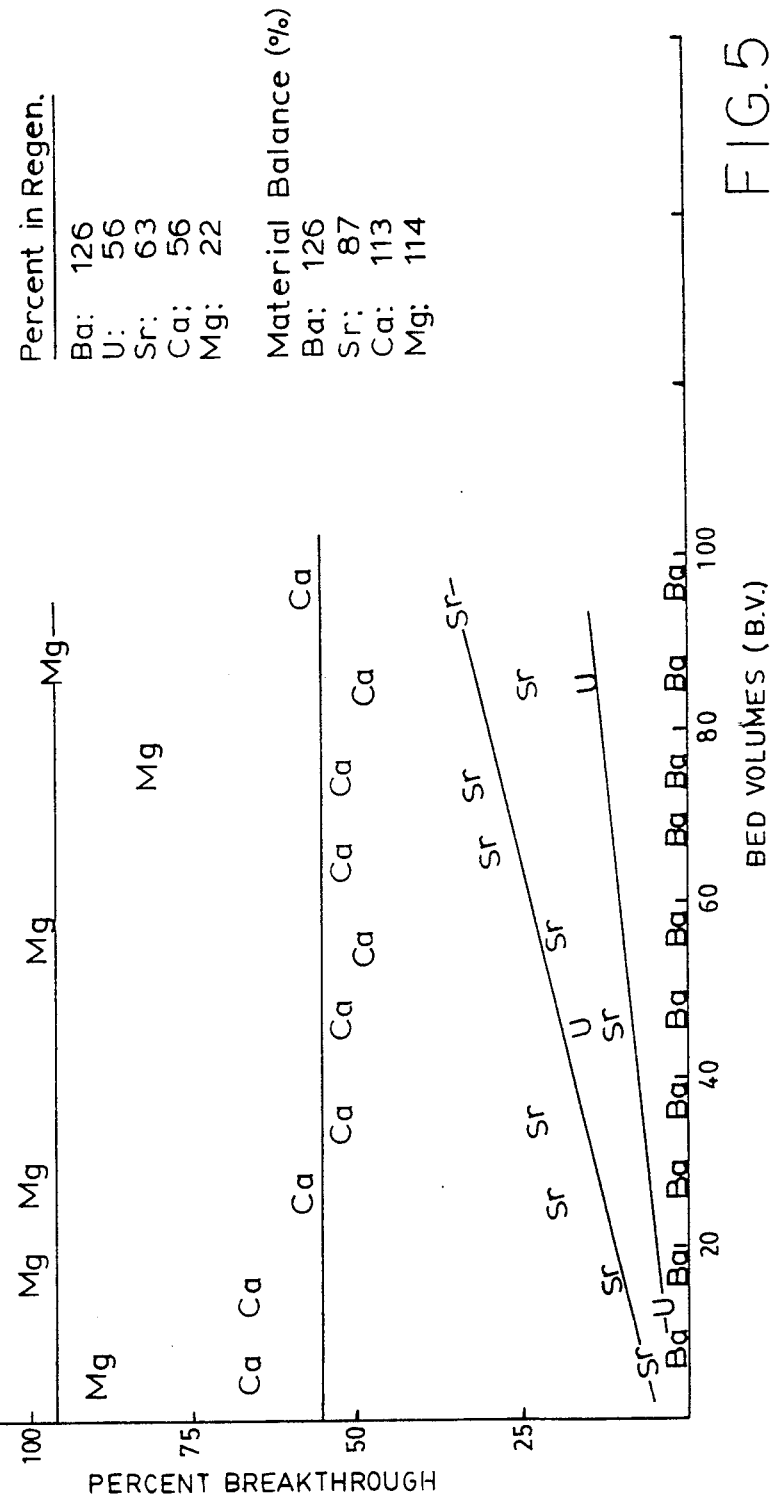
FIG. 5 is a plot showing the percent breakthrough, as a function of bed volumes, when using the EMD media for the removal of heavy metals from water sources.

The following Table V lists the initial concentration of the heavy metal in the feed water, and the concentration after passing through the EMD media bed. An example of the percent breakthrough, as a function of bed volumes (B.V.), is plotted in FIG. 5.

Figure 6:
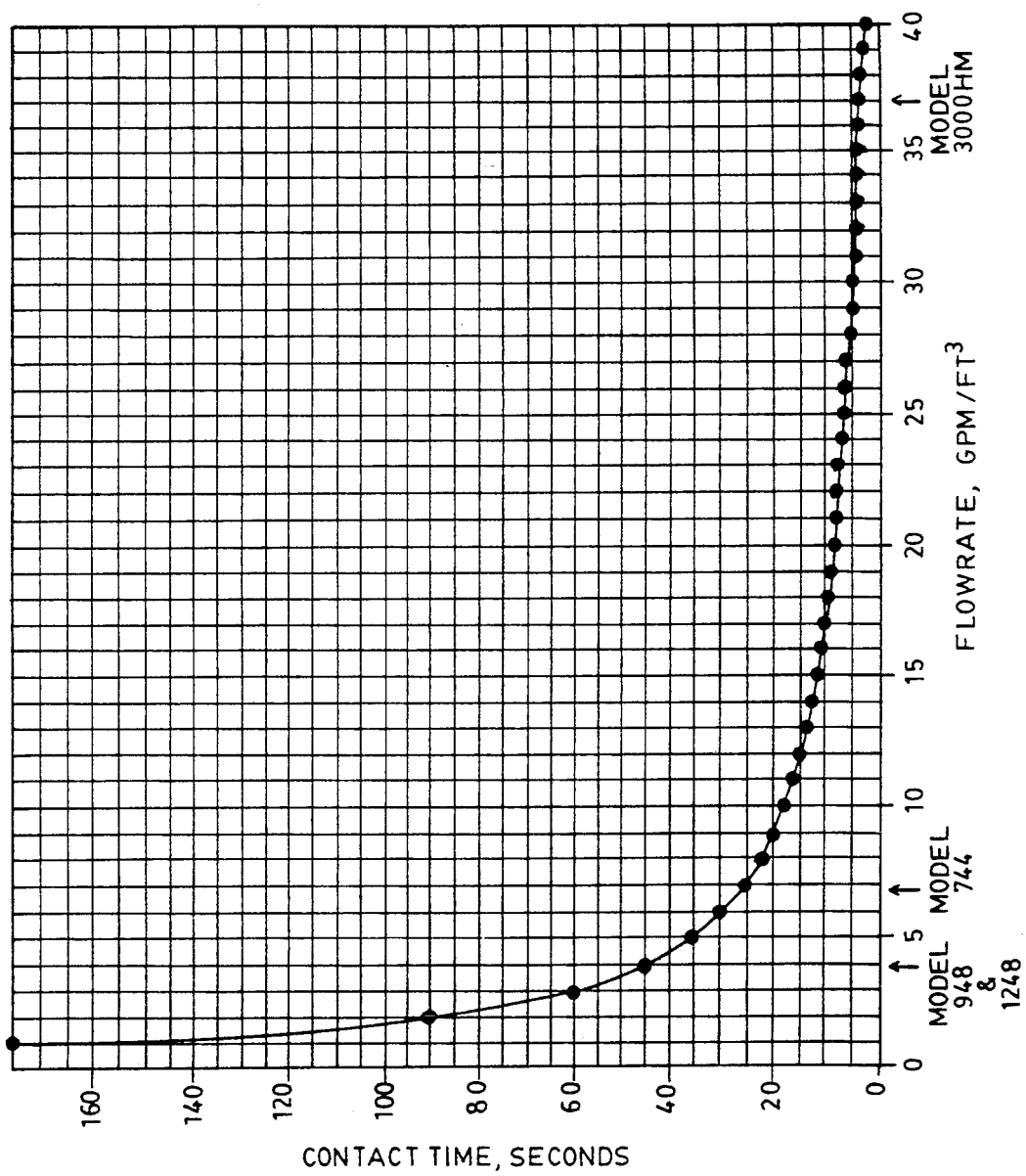
FIG. 6 is a plot of contact time versus flow rate for various embodiments using the present invention.
Figure 7:
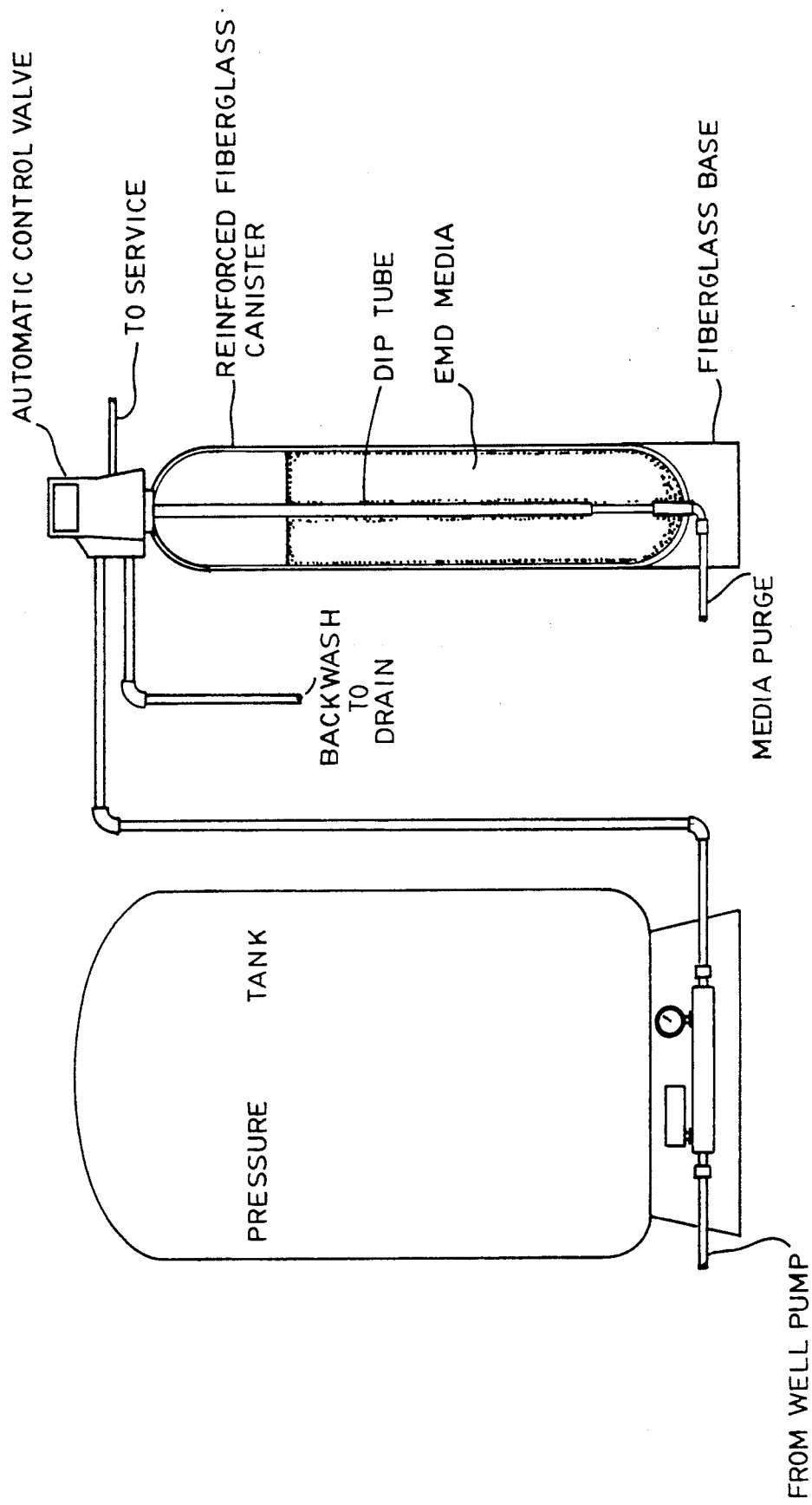
FIG. 7 is a drawing of a typical installation using the present invention.

The necessary reaction times or liquid contact time required for the removal of the various contaminants were found to be of great importance throughout these tests. To complete the reaction of sulfide, iron or manganese, it was found that approximately 25-60 seconds was required. This is illustrated in FIG. 6 which shows Contact Time vs. Flowrate. The Model Numbers 744,948 and 1248 designate tank sizes used for domestic sulfide, iron and/or manganese removal. For instance a Model 744 is a 7-inch diameter by 44-inch tall canister with a 25 second contact time.

schematic and typical installation for these systems is shown in FIG. 7.

Another application of the EMD media, and one of great importance due to the proposed lowering of the EPA permissible levels in drinking water, is that of lead (Pb) removal. It is proposed that these permissible levels be reduced from the present value of 50 ppb to 10 ppb at the consumers tap (5 ppb for municipalities). Lead has been found in many potable waters and appears to be coming from older lead transport pipes or joints and from lead in copper pipe solder. Considerable work has been done to demonstrate use of the EMD media for lead removal as shown below.

This lead test was conducted to simulate in-home use of the Model 3000 HM unit (2.5 inch diameter by 10-inch tall disposable cartridge of EMD media followed by a carbon impregnated paper filter) on an actual 3000 gallon run. While the actual in-home use of this quantity of water might take many months to several years, this test was conducted in a six day continuously running mode. Thus, the test was a much more stringent condition, kinetically, than actually encountered domestically.

Figure 8:
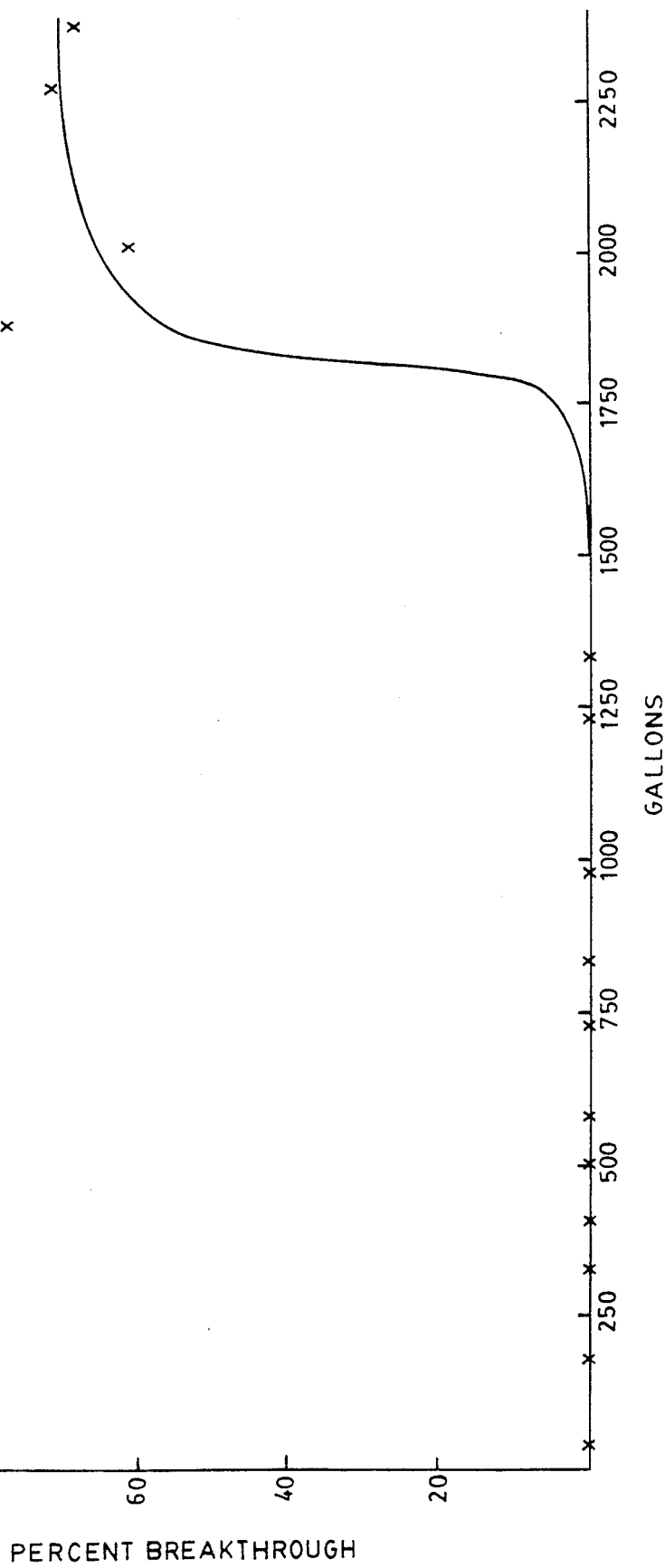
FIG. 8 is a plot illustrating the removal of lead from waters containing the same using EMD media showing the point of breakthrough.

In this test, a feed containing 100 ppb (ten times the EPA proposed level) was passed through a 42 cubic inch column. The effluent was analyzed for lead content as a function of gallons of feed to the column. The results of this continuous run is plotted in FIG. 8. It can be seen that breakthrough occurred at about 1900 gallons. This represents 29,965 mg/cubic feet of lead loading at 0.9 gpm, or a five second contact time. The test was continued through 2400 gallons to prove that the lead in the effluent never exceeded the feed or took lead off a loaded column. Even at 2285 gallons and 2390 gallons of feed, the effluent was 72 ppb lead, or 65% of that feed.

To further investigate the effectiveness of the EMD media for the removal of lead, higher levels of 500 ppb,

TABLE V

| | | HEAVY METALS REMOVAL BY EMD MEDIA | | | | |
|---|---|---|---|---|---|---|
| ELEMENT | FEED (ppm) | EFFLUENT (ppm) | REMOVAL (%) | BED VOLUMES | LOADING (mg/ft³) | MAXIMUM ALLOWED* (ppm) |
| Lead | 0.050 | <0.010 | 80 | 23,885 | 35,485 | 0.05 |
| (as PbCl) | 0.100 | 0.000 | 100 | 1,750 | 30,000 | |
| | 0.500 | 0.000 | 100 | 1,400 | | |
| | 1.0 | 0.0 | 100 | 920 | 28,000 | |
| | 1.4 | 0.0 | 100 | 40 | 1,586 | |
| | 8.3 | 0.0 | 100 | 40 | 9,400 | |
| | 8.0 | 0.0 | 100 | 40 | 9,060 | |
| Barium** | 2.5 | 0.0 | 100 | 40 | 2,831 | 1.0 |
| Cadmium | 1.9 | ≦0.3 | >84 | 40 | 2,152 | 0.01 |
| Chromium III | 9.8 | ≦0.4 | 99.2 | 40 | 11,100 | 0.05 |
| Mercury | 10.0 | 0.0 | 100 | 40 | 11,325 | 0.002 |
| | 100.0 | 0.0 | 100 | 40 | 113,250 | |
| Silver | 2.0 | 0.0 | 100 | 40 | 2,265 | 0.05 |
| | 16.0 | ≦0.6 | 96.3 | 40 | 18,120 | |
| Strontium** | 1.2 | ≦0.7 | 42 | 40 | 1,360 | — |
| Cobalt** | 1.3 | 0.0 | 100 | 180 | 6,625 | — |
| Copper | 4.72 | ≦1.0 | 79 | 40 | 5,345 | 1.0 |

*EPA Interim Primary drinking Water Standards
**CO & Ra > Ba > U > Sr (Affinity Series)

Certain of the heavy metals, such as lead and cobalt, can be removed in much faster contact times (e.g., 5-10 seconds). Representing the latter, the Model 3000 HM is a 2.5-inch by 10-inch tall cartridge for lead removal with five second contact time.

The applications of sulfide, iron and manganese removal have been further demonstrated in field conditions for domestic and industrial uses. The equipment 1000 ppb and 8300 ppb were fed to the column used for obtaining the data on the 100 ppb lead feed. The results are shown in Tables VI, VII and VIII. The stability of this EMD media was also demonstrated, as illustrated in Table IX, where the column was loaded with a feed containing 8000 ppb lead, and then washed with 144 degree water and residual chlorine. Both are materials potentially found at the consumer's tap.

TABLE VI

LEAD REMOVAL ON EMD MEDIA
500 ppb (0.5 ppm) Pb
1.9 cm Column (25 ml EMD Media)
50 Seconds Contact Time

| SAMPLE | VOL. (l) | pH | Pb ppm | Pb mg | Pb % |
|---|---|---|---|---|---|
| Feed | 44.0 | 6.9 | 0.5 | 22.0 | 100 |
| Effluent 10 | 5.0 | 8.8 | 0.0 | 0.0 | 0.0 |
| 20 | 10.0 | — | 0.0 | 0.0 | 0.0 |
| 30 | 15.0 | — | 0.0 | 0.0 | 0.0 |
| 40 | 20.0 | 7.6 | 0.0 | 0.0 | 0.0 |
| 50 | 25.0 | — | 0.0 | 0.0 | 0.0 |
| 60 | 30.0 | 6.9 | 0.0 | 0.0 | 0.0 |
| 70 | 35.0 | — | 0.0 | 0.0 | 0.0 |
| 80 | 40.0 | — | 0.2 | | |
| 88 | 44.0 | — | 0.1 | | |
| 1M HCl | 0.260 | | 73 | 19.0 | 92 |
| 1M HNO$_3$ | 0.265 | | 5.0 | 1.3 | |
| | | | | 92% Material Balance | |

TABLE VIII

LEAD REMOVAL ON EMD MEDIA
8300 ppb (8.3 ppm) Pb
1.9 cm Column (25 ml EMD Media)
50 Seconds Contact Time

| SAMPLE | VOL. (ml) | pH | Pb ppm | Pb mg | Pb % |
|---|---|---|---|---|---|
| Feed | 1000.0 | 6.4 | 8.3 | 8.3 | 100 |
| Effluent 1 | 250.0 | — | 0.0 | 0.0 | 0.0 |
| 2 | 250.0 | 8.1 | 0.0 | 0.0 | 0.0 |
| 3 | 250.0 | 7.9 | 0.0 | 0.0 | 0.0 |
| 4 | 250.0 | — | 0.0 | 0.0 | 0.0 |
| 1M HNO$_3$ | 310.0 | | 24.0 | 8.0 | 96 |
| | | | | 96% Material Balance | |

TABLE IX

STABILITY OF LEAD ON EMD MEDIA
8000 ppb (8.0 ppm) Pb Loading
1.9 cm Column (25 ml EMD Media)
30 Seconds Contact Time

| SAMPLE | VOL. (Ml) | Pb (ppm) | COMMENTS |
|---|---|---|---|
| Feed | 1000 | 8.0 | 8.0 mg loading |
| Effluent 1 | 200 | 0.0 | |
| 2 | 200 | 0.0 | |
| 3 | 200 | 0.0 | |
| 4 | 200 | 0.0 | |
| 5 | 200 | 0.0 | |
| Feed: | Hot Water From Tap - 62° C. (144° F.) | | |
| Effluent 1 | 200 | 0.0 | |
| 2 | 200 | 0.0 | |
| 3 | 200 | 0.0 | |
| 4 | 200 | 0.0 | |
| 5 | 200 | 0.0 | No Pb eluted |
| Feed: | 5 ppm Chlorine In Tap Water | | |
| Effluent 1 | 200 | 0.0 | |
| 2 | 200 | 0.0 | |
| 3 | 200 | 0.0 | |
| 4 | 200 | 0.0 | |
| 5 | 200 | 0.0 | No Pb eluted |

None of the lead contaminant was eluted with these materials.

As stated above, activated carbon is probably the most commonly used material for water treatment. Approximately 80,000 tons of activated carbon are used annually for this purpose in the United States. One of the problems associated with ordinary activated carbon is the growth of bacteria which, although not a health hazard, creates a "slimy" filtration media. This problem can be reduced through the use of a heavy metal, such as silver, with the carbon. However, when water supplies contain a high concentration of chlorine (or chloride), there is a reaction with the silver which reduces its effectiveness. In contrast, the EMD media reported herein and beads of EMD media agglomerated

TABLE VII

LEAD REMOVAL ON EMD MEDIA
1000 ppb (1.0 ppm) Pb
1.9 cm Column (25 ml EMD Media)
8 Seconds Contact Time (C.T.)

| SAMPLE | VOL. (ml) | (FAST) pH | Pb (ppm) | Comments | Sample | Vol. (Ml) | pH | Pb (ppm) | Comments |
|---|---|---|---|---|---|---|---|---|---|
| Feed | | 7.1 | 1.0 | | 26 | 500 | | 0 | Start |
| Effluent 1 | 500 | | 0 | | 27 | 500 | | 0 | 6 Sec. |
| 2 | 500 | | 0 | | 28 | 500 | | 0 | C.T. |
| 3 | 500 | | 0 | | 29 | 500 | | 0 | |
| 4 | 500 | 8.4 | 0 | | 30 | 500 | | 0 | 600 B.V. |
| 5 | 500 | | 0 | | 31 | 500 | | 0 | |
| 6 | 500 | | 0 | | 32 | 500 | | 0 | |
| 7 | 500 | 8.0 | 0 | | 33 | 500 | | 0 | |
| 8 | 500 | | 0 | | 34 | 500 | | 0 | 680 B.V. |
| 9 | 500 | | 0 | | 35 | 500 | | 0 | |
| 10 | 500 | | 0 | | 36 | 500 | | 0 | |
| 11 | 500 | | 0 | | 37 | 500 | | 0 | |
| 12 | 500 | | 0 | 240 B.V. | 38 | 500 | | 0 | 760 B.V. |
| 13 | 500 | | 0 | | 39 | 500 | | 0 | 19 mg/25 ml |
| 14 | 500 | | 0 | | 40 | 500 | | 0 | |
| 15 | 500 | | 0 | | 41 | 500 | | 0 | |
| 16 | 500 | | 0 | | 42 | 500 | | 0 | |
| 17 | 500 | 7.6 | 0 | | 43 | 500 | | 0 | |
| 18 | 500 | | 0 | | 44 | 500 | | 0 | |
| 19 | 500 | | 0 | | 45 | 500 | | 0 | |
| 20 | 500 | | 0 | | 46 | 500 | | 0 | |
| 21 | 500 | | 0 | | 47 | 500 | | 0.1 | First Break |
| 22 | 500 | | 0 | | 48 | 500 | | 0.1 | |
| 23 | 500 | | 0 | | 49 | 500 | | 0.2 | |
| 24 | 500 | | 0 | | 50 | 500 | | 0.2 | 1000 B.V. |
| 25 | 500 | | 0 | | | | | | |
| | | | | 25 mg Pb/25 ml or 28,300 mg Pb/ft$^3$ | | | | | | with carbon have been tested for bacterial growth and essentially none has been found over extended time periods. Thus, with eliminating the need for a heavy metal for combating the bacterial growth, there is additional capacity in the EMD media to take up the various contaminants and bleeding of heavy metals into the drinking water is eliminated.

Figure 10:
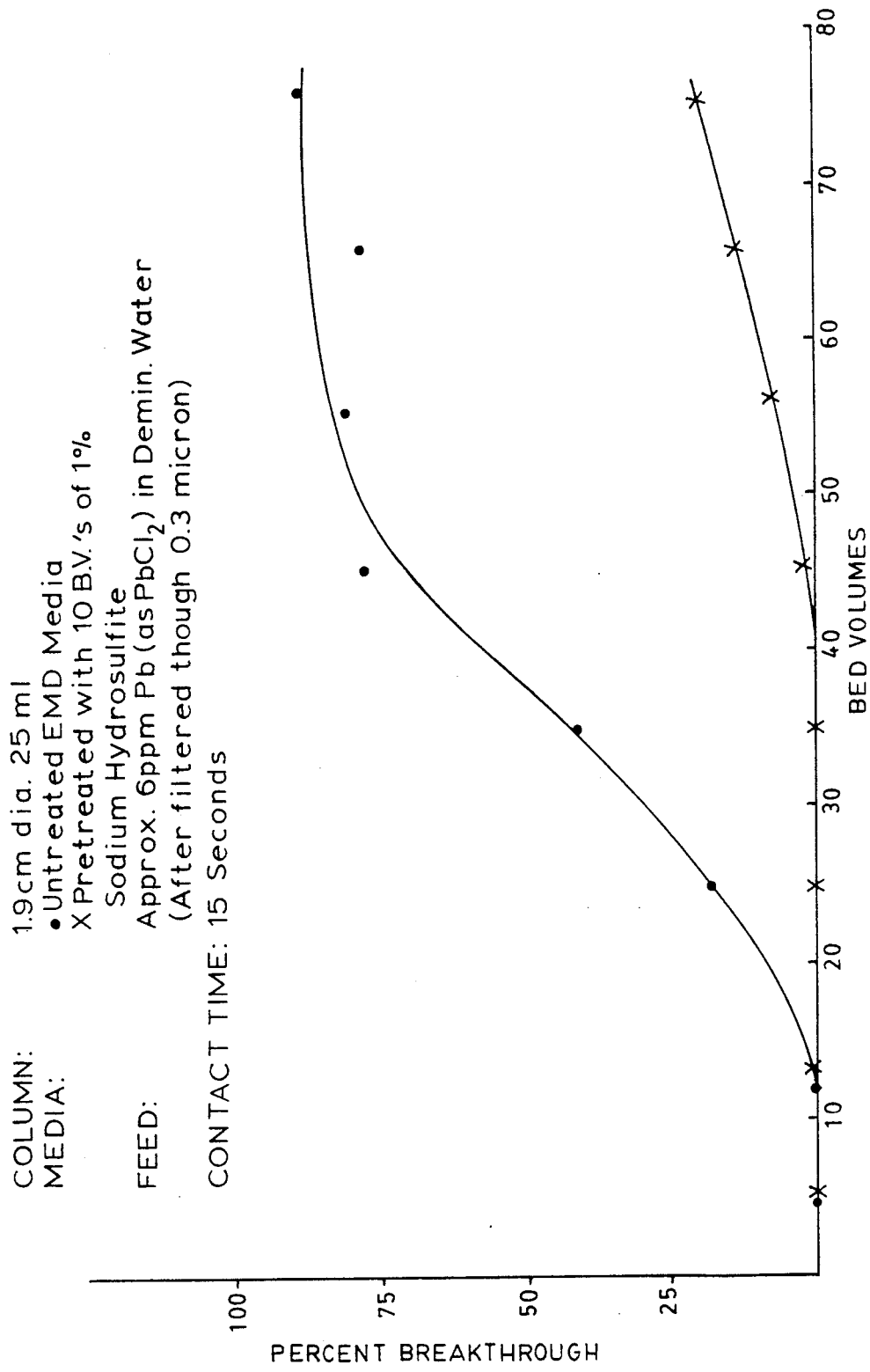
FIG. 10 is a plot illustrating the improvement of lead removal by EMD when pretreated with dilute sodium hydrosulfite.
Figure 9:
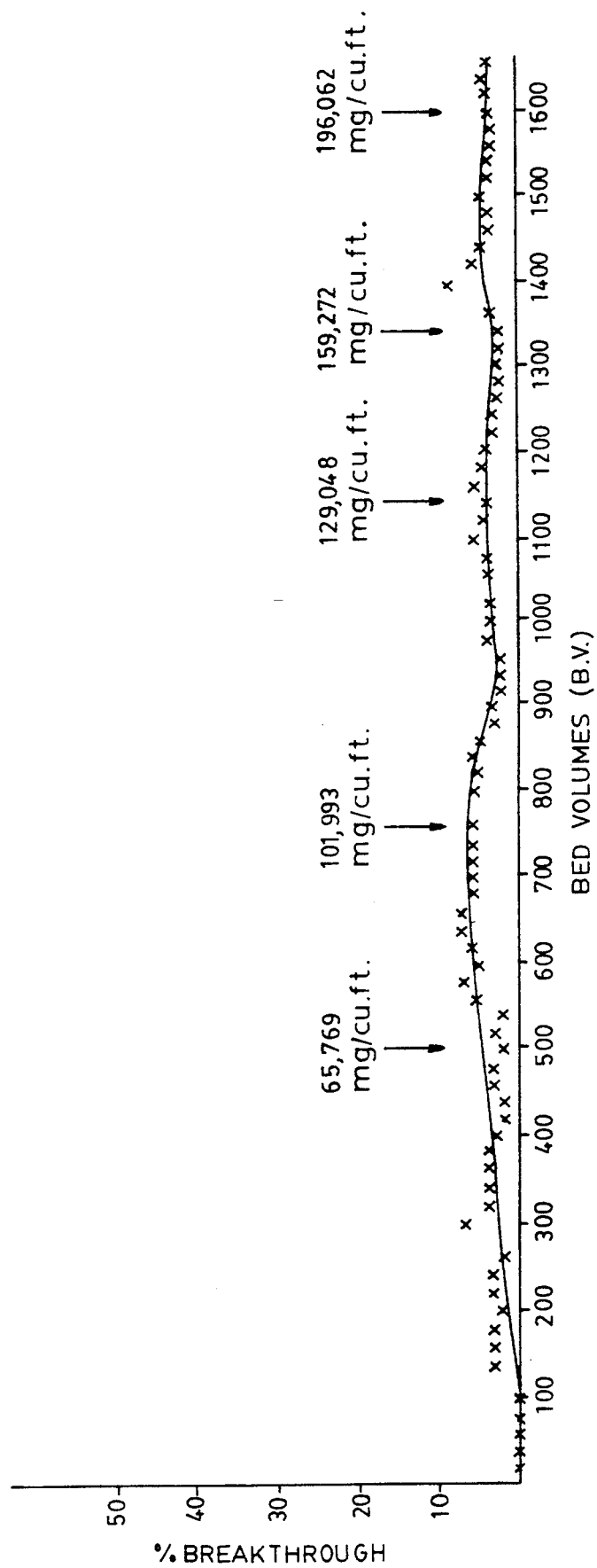
FIG. 9 is a plot illustrating the effective removal of chlorine using EMD media that was pretreated with dilute sodium hydrosulfite.

Chlorine is another contaminant that has been removed in the prior art with activated carbon. Chlorinated municipal waters generally run 1 to 4 ppm residual chlorine, while industrial waters can run much higher. It has been found that the EMD media is very effective for the chlorine removal. Further, it has been found that the bed is easily regenerated using a dilute solution (about 1% by wt) sodium hydrosulfite. A 5 ppm chlorine feed was passed through a test bed that had been pretreated with the hydrosulfite. The results are plotted in FIG. 9 where it can be seen that less than a 5% breakthrough had occurred. This is comparable to a total loading as achieved with high grade activated carbon. The effect of the pretreatment using the sodium hydrosulfite, in fact, demonstrated that the micropore structure of the EMD media was provided with additional adsorptive sites. This was confirmed with relation to the removal of lead. Plotted in FIG. 10 are the results of the breakthrough of lead with an untreated EMD media bed and one that is previously treated with the dilute sodium hydrosulfite thus indicating the benefits of the pretreatment.

It can thus be seen that the EMD media will remove nearly all metal contaminants to the above-listed drinking water levels specified by the Environmental Protection Agency. For certain metals, e.g., Cd and Cr (see Table V) a small additional finishing cation resin column may be required to further lower the concentrations.

From the foregoing, it will be understood by those versed in the art that a catalytic oxidizing/reducing and adsorbent media has been produced that will singularly be of value in the treatment of many types of water. The oxidized/reduced or adsorbed material can be removed, to regenerate the media, by simple water backwashing, by dilute acid treatment, etc. In most instances, the new EMD media has a capacity for the contaminant many times that of the various individual prior art materials used in water purification. The EMD media or derivatives are bacteriostatic, i.e., it will not support the growth of bacteria. While the specific removal capacities for certain metals is given, these are not cited as a limitation of the EMD media but as an illustration of typical metals that can be removed from water solutions. Thus, the present invention is not to be limited by these illustrations of use but, rather, by the appended claims and their equivalents when read in light of this description of the invention.

We claim:

1. A microporous regenerable oxidizing/reducing and absorbent media for the removal of heavy metals and other contaminants from water sources, said media being battery grade gamma form electrolytic manganese dioxide that has been comminuted and sized to 20-60 mesh, neutralized to about pH 7-8, washed to remove fine particles to less than about 0.12% and to remove residual acidity and neutralization reaction products, and completely dried prior to use for said removal of said contaminants.

2. The media of claim 1 wherein said comminuted electrolytic manganese dioxide is sized on 20-60 mesh screens, and said neutralizing and washing are performed with said comminuted electrolytic manganese dioxide supported on said screens.

3. The media of claim 1 wherein said communited electrolytic manganese dioxide is sized on 20-60 mesh screens, and said neutralizing and washing are performed in a rotating drum with a 60 mesh exit screen.

4. The media of claim 1 wherein said neutralization is accomplished with sodium hydroxide, and said washing is accomplished with water.

5. The media of claim 4 wherein about 4 pounds of sodium hydroxide are used per 270 pounds of comminuted electrolytic manganese dioxide.

6. The media of claim 1 wherein said drying is carried out in a rotary kiln.

7. The media of claim 1 further treated with a solution of about 1 wt % sodium hydrosulfite subsequent to said drying.

8. A method for the preparation of a microporous regenerable inorganic oxidizing/reducing and adsorbent media for use in the removal of heavy metals and other contaminants from water sources, which comprises the steps:
comminuting battery grade gamma-form electrolytic manganese dioxide;
sizing said comminuted electrolytic manganese dioxide to 20-60 mesh;
neutralizing said sized electrolytic manganese dioxide to about pH 7-8;
washing said neutralized electrolytic manganese dioxide with water to remove fine particles to less than about 0.12% and to remove residual acidity and neutralization reaction products; and completely drying said washed material.

9. The method of claim 8 wherein said sizing step of said communited electrolytic manganese dioxide is accomplished on 20-60 mesh screens, and said neutralizing and washing steps are performed in a rotating drum with a 60 mesh exit screen.

10. The method of claim 8 wherein said neutralization step is accomplished with sodium hydroxide.

11. The method of claim 10 wherein about 4 pounds of sodium hydroxide are used per 270 pounds of comminuted electrolytic manganese dioxide.

12. The method of claim 8 wherein said drying step is carried out in a rotary kiln.

13. The method of claim 8 further including the step of treating said dried material with a solution of about 1 wt % sodium hydrosulfite.

14. A method for the preparation of a microporous regenerable inorganic oxidizing/reducing and adsorbent media for use in the removal of heavy metals and other contaminants from water sources, which comprises the steps:
comminuting battery grade gamma-form electrolytic manganese dioxide;
sizing said comminuted electrolytic manganese dioxide to 20-60 mesh on 20-60 mesh screens;
neutralizing said sized electrolytic manganese dioxide to about pH 7-8 with sodium hydroxide while maintaining said sized electrolytic manganese dioxide with a 60 mesh exit screen in a rotating drum;
washing said neutralized electrolytic manganese dioxide with water in said rotating drum to remove fine particles to less than about 0.12% and to remove residual acidity and neutralization reaction products; and
completely drying said washed material in a rotary kiln.

* * * * *